May 9, 1961 G. P. ROBINSON 2,983,576
RECOVERY OF LITHIUM FROM ORE
Filed March 27, 1959
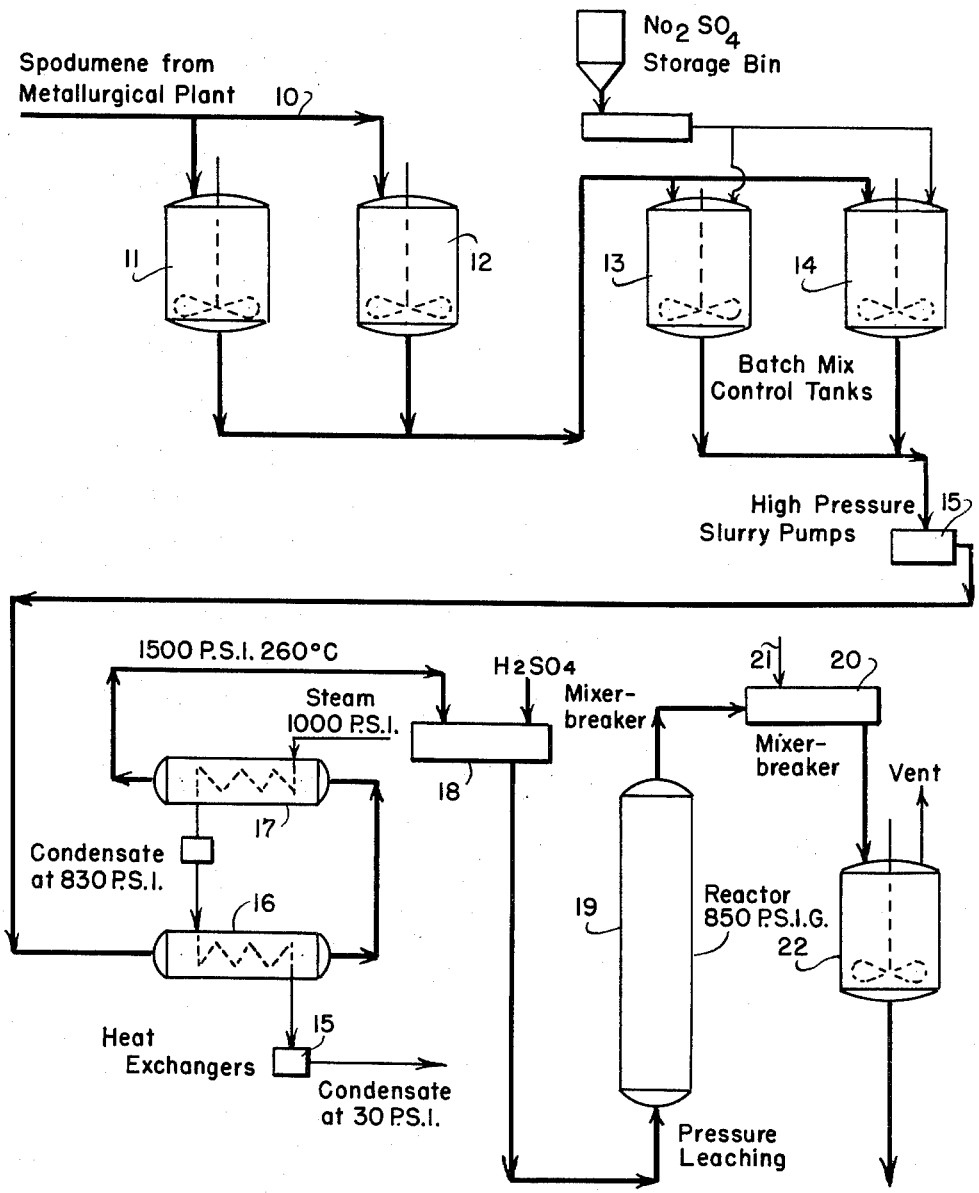
INVENTOR.
GEORGE P. ROBINSON
by Greene, Pucles & Durr
ATTORNEY.

United States Patent Office 2,983,576
Patented May 9, 1961

2,983,576

RECOVERY OF LITHIUM FROM ORE

George P. Robinson, Vale, N.C., assignor to Basic Atomics Incorporated, New York, N.Y., a corporation of Delaware Filed Mar. 27, 1959, Ser. No. 802,517

8 Claims. (Cl. 23—32)

This invention relates to a process for the recovery of lithium from ore material of minerals containing lithium, silica and alumina, especially ores containing spodumene ($Al_2O_3.Li_2O.SiO_2$).

This application is a continuation-in-part of my application Serial No. 667,994, filed June 25, 1957, now abandoned.

One commercial method of recovering lithium values from spodumene ore, as disclosed in U.S. Patent No. 2,516,109, involves the steps of first decrepitating the ore by heat to change the denser alpha spodumene (S.G. 3.15) to beta spodumene (S.G. 2.6), crushing the beta-spodumene, treating the ore with concentrated sulfuric acid at 200–300° C. to change the lithium present to lithium sulfate and leaching the lithium sulfate from the resultant product. In this process temperatures higher than 300° are disclosed for the sulfuric acid treatment but as the temperature is increased above 300° C. the yield decreases; at 500° C. the yield is only 47.3% of available lithium, for example, whereas at 300° C. yields of 85% are said to be obtained. Earlier processes have also disclosed a sulfuric acid treatment as a means of extracting lithium from some of its other ores.

The process of the present invention relates to the sulfuric acid recovery process and is based on the discovery that improved yields of available lithium are obtained when finely ground lithium ore is treated with sulfuric acid under pressures well above atmospheric. The previous decrepitation of alpha-spodumene ore is not necessary according to the present process although decrepitated ore or concentrates, or beta-spodumene may be employed if desired. Although alpha-spodumene is the most readily available lithium ore and is especially suitable as the raw material for the present invention other ore materials such as amblygonite, lepidolite, petalite or other similar lithium bearing ore may be used as the raw material either alone or mixed with the spodumene.

The ore is ground so that at least 80% and preferably 100% thereof is —325 mesh or smaller in particle size. The —325 mesh particles vary in size from 44 microns down to less than 10 microns. Especially good results are obtained when the size is less than 40 microns. Since the ore is not roasted, stack losses are not a problem.

The sulfuric acid employed may be substantially concentrated (94% $H_2SO_4$), or, if desired, somewhat diluted sulfuric acid (down to about 25%) may be employed. Since the heat treatment is conducted in a closed vessel the loss of sulfuric acid by vaporization is not a problem. Since the unconcentrated ore ordinarily contains only 1 to 2% of $Li_2O$, relatively small amounts of sulfuric are required, for example, 25–50% by weight of 66° Bé. acid. Higher amounts of sulfuric acid (100% or more) may be employed especially where the lithia content is high (4 to 6%). Where smaller amounts of acid are employed, water is added to provide for even distribution of the acid through the powdery mass. The total amount of liquid (acid and water) added may be quite small by volume so that the thoroughly mixed mass of powdered ore and acid may still be in the form of a powder. However, from the engineering standpoint it is advantageous to add enough water to form a slurry that can be pumped. A slurry containing 60% of solids or less can be readily pumped. With a slurry the proportion of acid in the aqueous phase is about 30–40% or more. The lower limit of solid concentration is somewhat arbitrary but from a practical standpoint 25% is about the lower limit. It has also been found that adding a small proportion (about 0.3 to 4%, based on the weight of the solids) of sodium sulfate to the slurry increases the fluidity and aids in the recovery. The sodium sulfate may be added to the water from which the slurry is made.

The heating of the ore in the presence of the sulfuric acid is conducted at temperatures of about 250–500° C. while the pressure within the sealed container builds up to about 50 to 2000 or more p.s.i.g. The higher pressures are required with the slurries. In general, the reaction is accelerated as the pressure increases. At these temperatures and pressures the lithium in the ore is changed to lithium sulfate in a comparatively short time (for example, about 30 minutes to four hours). Additions of water to the mass produce higher pressures when heated but the resultant pressures may be decreased somewhat by bleeding or leaving the reaction vessel open until the temperature reaches about 125° C., or by the insertion of breaker devices in the apparatus.

Subsequent to the heat and pressure treatment in the presence of sulfuric acid, the lithium sulfate is leached from the treated ore and the resultant liquor is purified and treated to recover lithium carbonate in the conventional manner.

It has also been found that better recovery is obtained when the mixture of powdered alpha-spodumene or similar ore and sulfuric acid is heated to the reaction temperature rapidly. The reaction between the powdered ore and sulfuric acid is exothermic and the temperature of the mixture increases without application of heat to above 125° C., for example. For a complete reaction, the slurry should be kept at the peak temperature for at least 2 hours; 4 hours at the peak temperature is very satisfactory.

The invention both as to its organization and its method of operation together with additional objects and advantages thereof will best be understood from the following description of specific embodiments thereof. Unless otherwise stated all proportions or percentages recited in the specification are proportions or percentages by weight.

*Example 1 (No. 22A)*

20 parts of finely ground alpha-spodumene ore assaying 1.48% $Li_2O$ and having 82% of —325 mesh particles, 10% of —200 to +325 mesh particles and minor amounts of coarser particles were mixed with 9 parts (45%) by weight of 66° Bé. sulfuric acid. After thorough mixing to obtain a slightly moist, powdery mass the composition was charged into a sealable reactor equipped with a thermometer and a pressure gauge. The reactor was sealed and heat was applied to the outside thereof. The composition was heated until a uniform temperature of 290° C. and a pressure of 370–390 p.s.i.g. were recorded and the contents were held at this temperature for approximately 30 minutes. Thereafter, the reactor was allowed to cool until the pressure was approximately atmospheric, the reactor was opened and the contents mixed with about 110 parts of water. After thorough mixing for 30 minutes at about 95° C. the slurry was filtered and 104 parts of filtrate assaying 1683 p.p.m. of lithia ($Li_2O$) were obtained. Washing produced 80 parts of additional filtrate assaying about 1286 p.p.m. Approximately 90% extraction was obtained.

Example 2 (No. 15-A)

The process was conducted as in Example 1 except that the ground powered ore contained only 33% of the −325 mesh particles and 45.6% of the −200 to +325 mesh particles. The sulfuric acid charge was reduced to 8 parts for 20 parts of the ore (or 40%). The ore was ground while wet and the acid was mixed with the ore while the latter was still hot from the drying step. Approximately a 74% extraction of available lithium was obtained under these conditions. The additional yield of Example 1 appears to be due to the finer grinding of the ore.

Example 3 (No. 12-A)

The process was conducted as in Example 2 except that only 30% of acid was added to the powdered ore. Under these conditions the extraction was about 70%.

Example 4

The process of Example 1 was repeated except that the temperature was allowed to go only to 280° C. and the pressure to 350 p.s.i.g. A 78% extraction of available lithia was obtained.

Example 5

The process of Example 1 was repeated except that the mass was heated at a slower rate and the temperature was allowed to go only to 270° C. and the pressure to 350 p.s.i.g. Under these conditions an 81% extraction was obtained.

Example 6

The process was conducted as in Example 1 with an ore which assayed 1.98% of lithia ground so that 74.4% was −325 mesh, 19.6% was −200 to +325 mesh and 2% −150 to +200 mesh. Six parts (30%) of 66° Bé. sulfuric acid and 1.5 parts of water were mixed with the powder. The temperature of the reactor was allowed to go only to 245° C. and the pressure to 318 p.s.i.g. Under these conditions about 70% of available $Li_2O$ was obtained from the leaching and washing treatments.

In order to test the effect of particle size the −325 mesh powder was separated into fractions according to size and several fractions were heated under approximately the same conditions as follows:

| Example | Particle Size in microns | Percent Acid by Weight of Charge | Temperature, ° C. | Pressure | Percent Extraction |
|---|---|---|---|---|---|
| 7 | 40-44 (90%) | 45 | 288-285 | 307 | 68.8 |
| 8 | 27-36 | 45 | 284-280 | 365 | 92 |
| 9 | 22-27 | 47 | 283-289 | 375 | 96 |
| 10 | −15 | 71 | 267-277 | 305 | 96 |

It will be appreciated that exactly identical heating conditions are not readily obtainable. With respect to Example 10 more acid was required in order to obtain substantially the same degree of acid distribution as in the Examples 7-9. The temperature range is given because the temperature was measured in different parts of the mass. It is readily apparent from the results of these examples that the fineness of the ground ore is an essential feature of the process.

Example 11

The process was conducted as in Example 1 with the following exceptions. The ore was ground to a particle size of 30 microns or less. To 15 parts by weight of the powdered ore, 6 parts by weight of 66° Bé. sulfuric acid plus 3 parts by weight of water were added. This mixture of acid and water comprises about 47.5% $H_2SO_4$ (and about 40% of acid based on the weight of the ore). The temperature was raised to 244° to 270° C. and the pressure measured 422 p.s.i.g. A 94% extraction was obtained.

Example 12

The process was conducted as in Example 1 except for the following changes. The ore was ground to a particle size of 30 microns or less. To 15 parts by weight of the powdered ore, 4 parts by weight of 66° Bé. sulfuric acid and 4 parts by weight of water were added. This mixture of acid and water is approximately 30% $H_2SO_4$ and provides about 26.7% of $H_2SO_4$ based on the weight of the ore. Instead of immediately heating the mixture, it was stored for approximately 64 hours and thereafter heated to 250-275° C. At this temperature the pressure measured was about 500 p.s.i.g. Approximately 84% of the lithium was extracted.

Example 13

A concentrate of ore ground to −325 mesh and containing 3.13% $Li_2O$ was added to an aqueous solution containing 40% of $H_2SO_4$ until a slurry containing 50% of total solids was obtained. For each pound of the concentrate .033 pound of sodium sulfate was added to the mix. The resultant slurry was pumped into a reactor vessel capable of withstanding internal pressures of 2000 p.s.i.g. The slurry was heated to 260° C. and maintained at this temperature for four hours. An 87% extraction was obtained.

Example 14

The process was conducted as in Example 13 except that the slurry was made up to contain 60% of solids. A 90% extraction was obtained.

Example 15

The process was conducted as in Example 13 except that 30% acid was employed to make the slurry. A 75% recovery was obtained.

From the results obtained from the above representative examples and from many similar examples conducted by the inventor the following conclusions have been drawn.

A. It is essential that the ore be ground very fine and for high recovery of over 75%, at least 80% and preferably 100% of the ore should be ground to a fineness of −325 and preferably to less than 40 microns. From all appearances the sulfuric acid is capable of penetrating about 10-20 microns into the particles under the conditions of this treatment.

B. Relatively small proportions of sulfuric (25%, for example) are adequate but the sulfuric acid should be so dispersed as to react with all of the particles. Where small amounts of sulfuric acid are employed water may be added or dilute sulfuric acid may be employed. With such dilute sulfuric acid solutions, a longer heating period may be required to obtain the maximum yield. Iron vessels are suitable for reaction vessels for the powdery mass is not very corrosive in spite of the highly concentrated sulfuric acid sometimes employed. For slurries, tantalum lined vessels have proved to be very satisfactory.

C. The conducting of the reaction under pressure is essential to the process. It is believed that the pressures above atmospheric not only allow the treatment to take place at higher temperatures without losing any of the sulfuric acid but in addition aid the reaction. It will be noted, for example, that in some treatments the temperature is maintained below the boiling point of the acid. Although not included as examples, recoveries of no more than about 25% of $Li_2O$ are obtainable by heating the ground ore in sulfuric acid at atmospheric pressure even where a great excess of sulfuric acid is employed.

The drawing is a flow sheet illustrating how the slurry process of Examples 13-15 may be carried out.

In the drawing, the finely ground spodumene ore concentrate thereof is introduced into tanks 11 and 12 then passed to control tanks 13 and 14 where sodium sulfate is added to the composition. From tank 13 and/or 14 the slurry is passed by means of a high pressure pump 15 to a two stage, steam heated, high pressure, heat exchanger device 16, 17. The slurry leaves the second unit 17 of the heat exchanger at a temperature of about 260° C. and a pressure of about 1500 p.s.i., for example, and is passed to a mixer breaker 18 where the sulfuric acid is added and where pressure is decreased to about 1000 p.s.i. Thorough mixing takes place in this mixer breaker 18. The heater mix of acid, ore, sodium sulfate and water at the reduced pressure then passes to the acid proof reactor 19 where the mix is allowed to remain for at least 2½ hours at 850 p.s.i. and 275° C. It will be noted that the heat required to bring the mix to the desired reaction temperature in cell 19 has already been added to the liquor at 16 and 17 and by the exothermic reaction produced by the addition of sulfuric acid at 18. The reacted mixture leaves the top of reactor 19 and passes to a second mixer breaker 20 for reducing the pressure down to about atmospheric. Dilute washwater may be introduced at 21 to cool the mixture. From mixer 20 the mix is passed to a vented flash tank 22 from which it may be withdrawn and fed to the leaching apparatus.

The features and principles underlying the invention described above in connection with specific exemplifications will suggest to those skilled in the art many other modifications thereof. It is accordingly desired that the appended claims shall not be limited to any specific feature or details thereof.

I claim:

1. A method of extracting lithium from alpha spodumene ores comprising providing a finely ground alpha spodumene ore in which at least 80% thereof is of −325 mesh particle size, mixing the ground alpha spodumene ore with 25 to 100% by weight of sulfuric acid, heating the mixture to a temperature of approximately 250 to 400° C. and at a pressure of 50 to 2000 p.s.i.g. and thereafter leaching lithium sulfate from the treated composition.

2. A method of extracting lithium from spodumene ores comprising providing a finely ground alpha spodumene ore in which at least 80% thereof is of −325 mesh particle size, mixing the ground ore with an aqueous liquor containing 25 to 50% by weight of sulfuric acid so that the effective concentration of the sulfuric acid in said mix is greater than about 25% $H_2SO_4$ based on the weight of the ore, heating the mixture under a pressure of 50–2000 p.s.i.g. and at a temperature of 250 to 400° C. for about ½ to 4 hours, and thereafter leaching lithium sulfate from the treated composition.

3. A method of extracting lithium from spodumene ores comprising providing a finely ground alpha spodumene ore in which at least 80% thereof is of −325 mesh particle size, mixing the ground ore with an aqueous liquor containing 25 to 50% by weight of sulfuric acid so as to form a slurry containing up to 60% solids and so that the effective concentration of the sulfuric acid in said mix is greater than about 25% $H_2SO_4$ based on the weight of the ore, heating the mixture under a pressure of 50 to 2000 p.s.i.g. and at a temperature of 250 to 400° C., and thereafter leaching lithium sulfate from the treated composition.

4. The process as claimed in claim 3 comprising adding about 0.3 to 4%, based on the weight of the solids, of sodium sulfate to said slurry.

5. The method as claimed in claim 1 wherein the mix is maintained within the temperature and pressure limits specified for a period of at least about two hours.

6. The method as claimed in claim 1 wherein substantially all of said ore is ground to a size of less than 40 microns.

7. A method of extracting lithium from alpha spodumene ores comprising providing a finely ground alpha spodumene ore in which at least 80% thereof is of −325 mesh particle size, mixing the ground alpha spodumene ore with 25 to 100% by weight of sulfuric acid, heating the mixture to a temperature of approximately 250 to 400° C. and at a pressure of 50 to 500 p.s.i.g. and thereafter leaching lithium sulfate from the treated composition.

8. A method of extracting lithium from spodumene ores comprising providing a finely ground alpha spodumene ore in which at least 80% thereof is of −325 mesh particle size, mixing the ground ore with 25 to 50% by weight of sulfuric acid and water so that the effective concentration of the sulfuric acid in said mix is greater than about 25% $H_2SO_4$, heating the mixture under pressure at a temperature of 250 to 400° C. and a pressure of 50 to 500 p.s.i.g., and thereafter leaching lithium sulfate from the treated composition.

References Cited in the file of this patent

UNITED STATES PATENTS

| 1,936,002 | Waggonner et al. | Nov. 21, 1933 |
| 2,793,933 | Kroll | May 28, 1957 |

OTHER REFERENCES

Schieffelin et al.: "Journal of the Society of Chemical Industry," vol. 27, 1908, page 549.